United States Patent [19]

Mills et al.

[11] Patent Number: 5,513,306
[45] Date of Patent: Apr. 30, 1996

[54] TEMPORAL EVENT VIEWING AND EDITING SYSTEM

[75] Inventors: Michael Mills, Cupertino; Jonathan Cohen, San Francisco, both of Calif.

[73] Assignee: Apple Computer, Inc., Cupertino, Calif.

[21] Appl. No.: 481,194

[22] Filed: Jun. 7, 1995

Related U.S. Application Data

[63] Continuation of Ser. No. 225,496, Apr. 11, 1994, abandoned, which is a continuation of Ser. No. 564,914, Aug. 9, 1990, abandoned.

[51] Int. Cl.$^6$ .................................................. G06T 1/00
[52] U.S. Cl. ..................... 395/148; 395/156; 395/161; 395/600; 395/160; 395/152
[58] Field of Search ................................. 395/148, 152, 395/154, 155, 157, 159, 160, 161, 600; 345/121–122; 360/13, 14.1, 14.3; 369/27–28, 69, 83–84; 434/47; 348/232, 552, 559, 563–565

[56] References Cited

U.S. PATENT DOCUMENTS

| | | | |
|---|---|---|---|
| 4,558,438 | 12/1985 | Jones et al. | 367/71 |
| 4,751,674 | 6/1988 | Aoyagi et al. | 364/900 |
| 4,763,186 | 8/1988 | Belmares-Sarabia et al. | 358/22 |
| 4,775,935 | 10/1988 | Yourick | 364/401 |
| 4,821,211 | 4/1989 | Torres | 364/521 |
| 4,914,586 | 4/1990 | Swinehart et al. | 364/200 |
| 4,943,866 | 7/1990 | Barker et al. | 358/335 |
| 4,951,233 | 8/1990 | Fujiwara et al. | 364/523 |
| 4,970,664 | 11/1990 | Kaiser et al. | 364/521 |
| 5,023,851 | 6/1991 | Murray et al. | 368/41 |
| 5,046,027 | 9/1991 | Taaffe et al. | 364/521 |
| 5,093,907 | 3/1992 | Hwong et al. | 395/152 |
| 5,101,364 | 3/1992 | Davenport et al. | 395/152 |
| 5,119,476 | 6/1992 | Texier | 395/157 |
| 5,157,511 | 10/1992 | Kawai et al. | 358/335 |

OTHER PUBLICATIONS

Tonomura et al., "Content Oriented Visual Interface Using Video Icons for Visual Database Systems", 1989, IEEE Workshop on Visual Languages, pp. 68–73.

*Primary Examiner*—Mark K. Zimmerman
*Assistant Examiner*—Joseph H. Feild
*Attorney, Agent, or Firm*—Blakely, Sokoloff, Taylor & Zafman

[57] ABSTRACT

A system for displaying a sequential stream of information on a single display. The system includes a computer for defining an first area on the display and for displaying a first sample of the information within the first area. The first sample represents a first segment of the information. The computer further is for displaying a second sample of the information within the first area of the display. The second sample represents a second segment of the information. The computer is further for displaying a third sample of the information within the first area of the display. The third sample represents a third segment of the information. The first segment includes the second segment and the third segment.

91 Claims, 12 Drawing Sheets

TEMPORAL EVENT VIEWING AND EDITING SYSTEM

This is a continuation of application Ser. No. 08/225,496, filed Apr. 11, 1994, abandoned, which is a continuation of application Ser. No. 07/564,914, filed Aug. 9, 1990, abandoned.

FIELD OF THE INVENTION

The present invention relates generally to video viewing, organizing, and composing devices, and more particularly to an iconically based system for cataloging, organizing and browsing through a database by generating hierarchical views of temporally occurring segments of information from the database.

BRIEF DESCRIPTION OF PRIOR ART

Many computerized audio/video viewing and composing systems allow a user to preview large chunks of analog or digital audio and/or video information stored in one or more types of devices, such as VCR's, optical discs, and sound players, and to mark particular segments of the information so as to create a digital clip of the previewed information for subsequent additional processing. The user of one of these typical video systems regulates the speed at which a video player displays the video information through either software controls or manual operation of a "jog-shuttle" potentiometer (a device which causes the video player to move forward or backward at a faster rate the further the jog-shuttle is turned in a particular direction).

The user typically creates digital video clips from the regulated video information through manual operation of hardware buttons or controls, which electronically mark the "in" and "out" points of the video clip. In particular, to mark these in and out points, the user must manipulate the speed and direction of playback of the video information with the jog-shuttle until a desired frame is in view, and then mark the selected video frame by pressing either an "in" (beginning) hardware button or an "out" (ending) hardware button on the control panel of the video editor. An in button marks the start of a video clip and an out button marks the end of a video clip.

To replace an in or out point of a video clip, the user must first move the video information to the location of the replacement video frame, such as by using either the Jog-shuttle or a "goto" hardware button. Goto buttons allow the user to move the video information back to a previously created in or out point. To replace the video frame once it has been located, the user must typically either press one of the in or out buttons to mark the frame or press some additional hardware buttons on the control panel of the editor so as to add or subtract flames of the clip. Some systems, which include a tape counter that monitors the frame number of displayed video segments, will allow a user to simply type in a frame number to create new in or out points.

Because low-end systems generally do not keep a log of in and out points, users must typically learn to write down the frame numbers of the in and out points when using the editing system. Although higher-end systems generally do keep a list of marked clips, this list is typically expressed in a textual rather than a pictorial form. Some newer systems do, however, keep a list of images, or static labels, which either correspond to one frame in the clip or a pair of frames in the clip (the in and out points), which may be useful as a type of log, but even these newer systems continue to follow the in and out hardware button paradigm, and continue to limit trim and goto buttons to use with previously created in and out points, rather than with any frame or point in a list of marked clips.

In addition, although some of these systems use static pictorial labels to designate larger segments or clips of video information, they generally do not organize or represent the labels in their most useful fashion. One attempt to resolve this problem is addressed in U.S. Pat. No. 4,538,188, issued to Barker et al., which discloses a video composition apparatus and method for temporally organizing the pictorial labels representing the video information. The Barker apparatus is comprised of a computerized operator control system for communicating with a plurality of storage devices, each storing identical copies of the same source material, and displaying that source material in various forms (static and active displays) on a plurality of different monitors.

In the Barker apparatus, one small active display acts as an intake screen and is controlled by a left manual control disk of the control system, while a second small active display acts as an outtake screen and is controlled by a right manual control disk of the control system. Manipulating the control disks in different manners causes contiguous frames of a current segment of video information to be displayed as temporary pictorial labels on the intake and outtake screens, while a third central display provides a continuous loop display of all picture frames from just prior to the temporary intake and Just after the temporary outtake pictorial labels. These same control disks are then manipulated to mark temporary pictorial labels which have been selected by the user to represent the current segment. Selected labels for the current segment are then displayed in a two row spatial array of passive displays (meaning the displays are static, not animated like the active displays) located below the active displays. The other passive displays are used to present a spatial display of the pictorial labels associated with the segments sequentially before and after the current segment. Although the passive displays are arranged in two rows, each column is limited to representing the same single sector of the video information. A label can be comprised of a single frame of video information (such that only one row of the passive display is utilized), or two flames, such as the beginning frame and the ending frame (such that both rows of the passive display are utilized). Once a label has been created, it can be replaced in the same manner in which it was created, but cannot be readily transformed.

The method steps described by Baker for selecting the segments from the video information, creating the labels, and composing the edited video product are broadly recited as follows: (a) selecting a start and an end frame for each of a plurality of segments from the video information; (b) creating at least one pictorial label identifying each segment; (c) selectively displaying the segments; (d) assembling a plurality of the labels into a serially connected label sequence; (e) locating any segment by displaying the label of the label sequence; and (f) displaying the segment identified by a selected label. While the steps of creating and organizing the labels in a single temporally organized row (two rows having labels in the same column describing the same segment would not be considered to be two separate rows for hierarchical organizational purposes) improve upon prior art methods of organizing video information for composition purposes, this technique falls far short of providing a meaningful, hierarchically-organized, cognitive structure for the segments of the video information, as would be required to truly enhance a user's ability to browse, organize, catalog, and compose long streams of temporally unfolding video information. Although this technique for temporally compressing the video information can provide, through use of the labels as static pointers to locations within the video stream, a quick overview of the content of the video information, the video stream itself is still transitory. Hence, this technique does not establish any relationship between shots, scenes or episodes that might emerge from within the video information and must continue to rely upon the mind's eye of the viewer to develop such relationships, at least until some electronic notepad or hard copy can be generated. In addition, the static labels utilized by Baker are distinguishable from the segments that they represent and are far too simplistic to be useful and practical in a composing apparatus having any degree of flexibility.

SUMMARY OF THE INVENTION

A preferred embodiment of the temporal event viewing and organizing system of the present invention comprises a computer system, an analog or digital video source, such as a video cassette recorder (VCR) or optical disc player, and a video processor/controller linking the computer system to the video source. The computer system includes a mass storage device, a control device and a display, and functions under the direction of standard operating and video editing software which provides the user with an interface for controlling and editing video information input from the video source. Upon initialization of the editing system, the user is presented with a video window for displaying the video information, a control window for regulating playback of the video information, and a video log window for displaying the video information represented by hierarchically-organized rows of temporally sequenced key flames. A key frame is a pictorial label for a variable-length segment of video information. Above the first row of key flames is a representation of the entire database of information available for scanning. The user manipulates a magnifier to select a subportion of the representation in order to select a subportion of the database of information. The first row of key frames to be displayed within the video log window collectively represents this subportion of information. After creation of the first row, and each subsequent row, additional magnifiers are made available for creating additional subrows of key frames, which represent further subportions of the database. These subapportionments of the database can continue until a subrow is generated having key frames which represent a segment size equal to one unit of information from the database, such as a single video frame. Each of these video log rows consists of a plurality of key frames above a scanning bar, which includes the magnifier for the subsequent row, and which denotes the range of the subportion of information for that row which was selected by the magnifier of the preceding row. Each key frame has a key frame marker (a graphical symbol whose position on the scanning bar indicates the key frame's position within that row's subportion of information). Video log rows, magnifiers, key frames, and key frame markers can all be modified and/or manipulated with the control device using direct manipulation techniques.

This and other embodiments of the present invention will no doubt become apparent to those skilled in the art after having read the following detailed disclosure of the preferred embodiment of the present invention which is illustrated in the several figures of the drawing.

DETAILED DESCRIPTION OF THE PREFERRED EMBODIMENT

Figure 1:
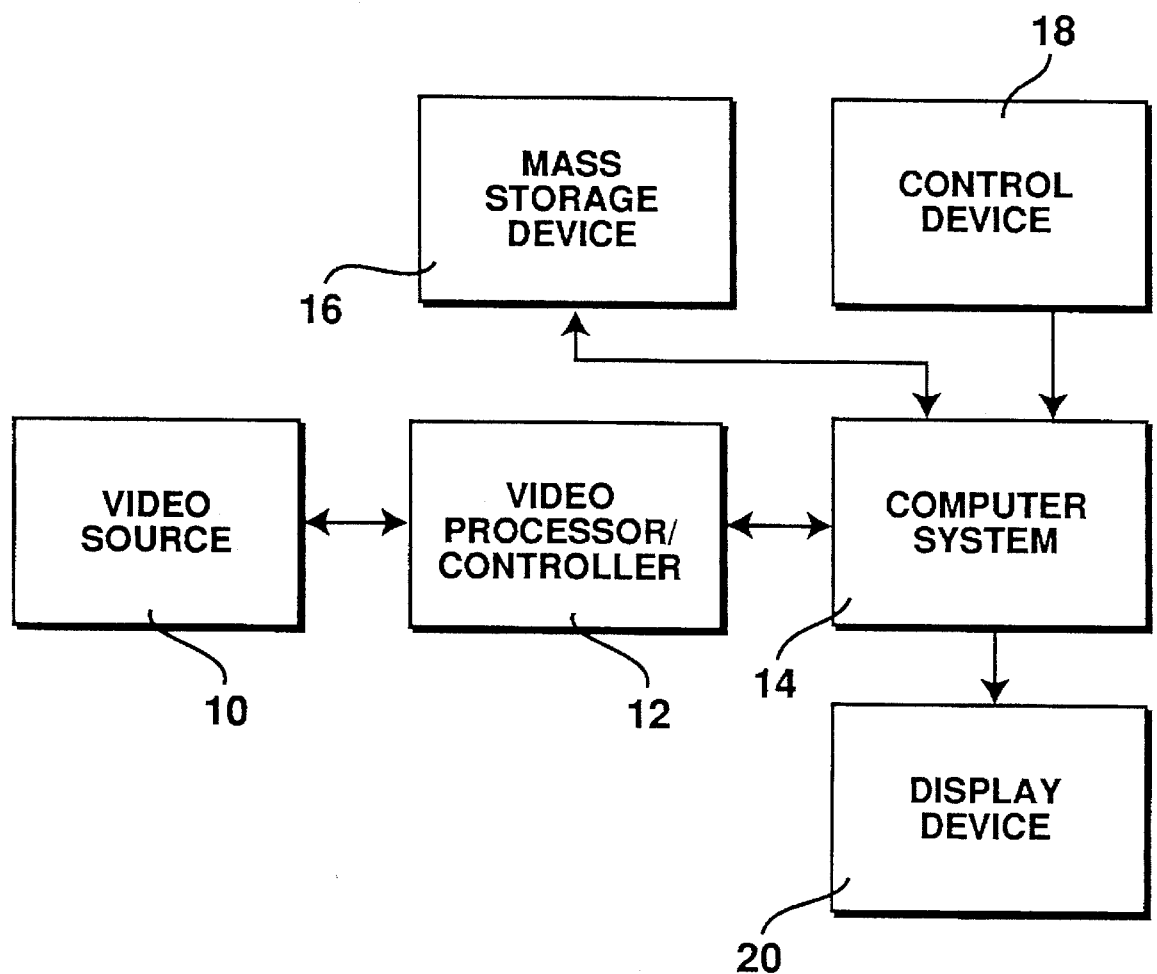
FIG. 1 is a block diagram representing a video viewing/organizing system in accordance with the preferred embodiment of the present invention.

A computer system for use in combination with the viewing and organizing system of the present invention is shown comprising a video source 10, a video processor/controller 12, and a computer system 14. The computer system 14 includes, or is in communication with, a mass storage device 16, a control device 18, and a display device 20, and could also include the video processor/controller 12 as an add-on board connected to its motherboard. Video information from the video source 10 is communicated to the video processor/controller 12 for conversion to digital signals, if necessary, and output to the computer system 14, where it is either displayed on the display device 20 or stored in the memory of the mass storage device 16. Although the present invention is described as being used to view, organize and compose video information, it could also be used in a similar manner to organize and modify any type of sequential visual or audio information (generically referred to as information from hereon) which is capable of being represented on the display device 20 of the system in some meaningful form.

The type of computer system 14 to be utilized in combination with the present invention is unlimited and includes any one of a broad range of different types of computers, although computer systems utilizing graphical user interfaces, such as the Macintosh® computer manufactured by Apple Computer, Inc., of Cupertino, Calif., are preferred. The computer system should typically include appropriate hardware and software for communicating with and/or controlling the source 10 of the audio and/or visual information. The type of video source 10 to be utilized is likewise unlimited and can also be any of a large number of different types of devices, such as a video cassette recorder (VCR), optical disc player, certain types of video cameras, etc. For example, by installing an Apple Display Card 4.8™, 8.24™, or 8.24gc™, manufactured by Apple Computer. Inc., and an encoder box, such as the Raster-Ops Video Expander manufactured by Raster-Ops, Inc., of Santa Clara. California, as the video processor/controller 12, the output from the computer system 14 can be converted to a form that can be recorded directly onto a VCR. It should also be noted that the present invention is not limited to use with an external information source, such as the video source 10, and may be equally employed to view and compose information already stored in either the memory of the computer or the mass storage device 16.

Figure 2:
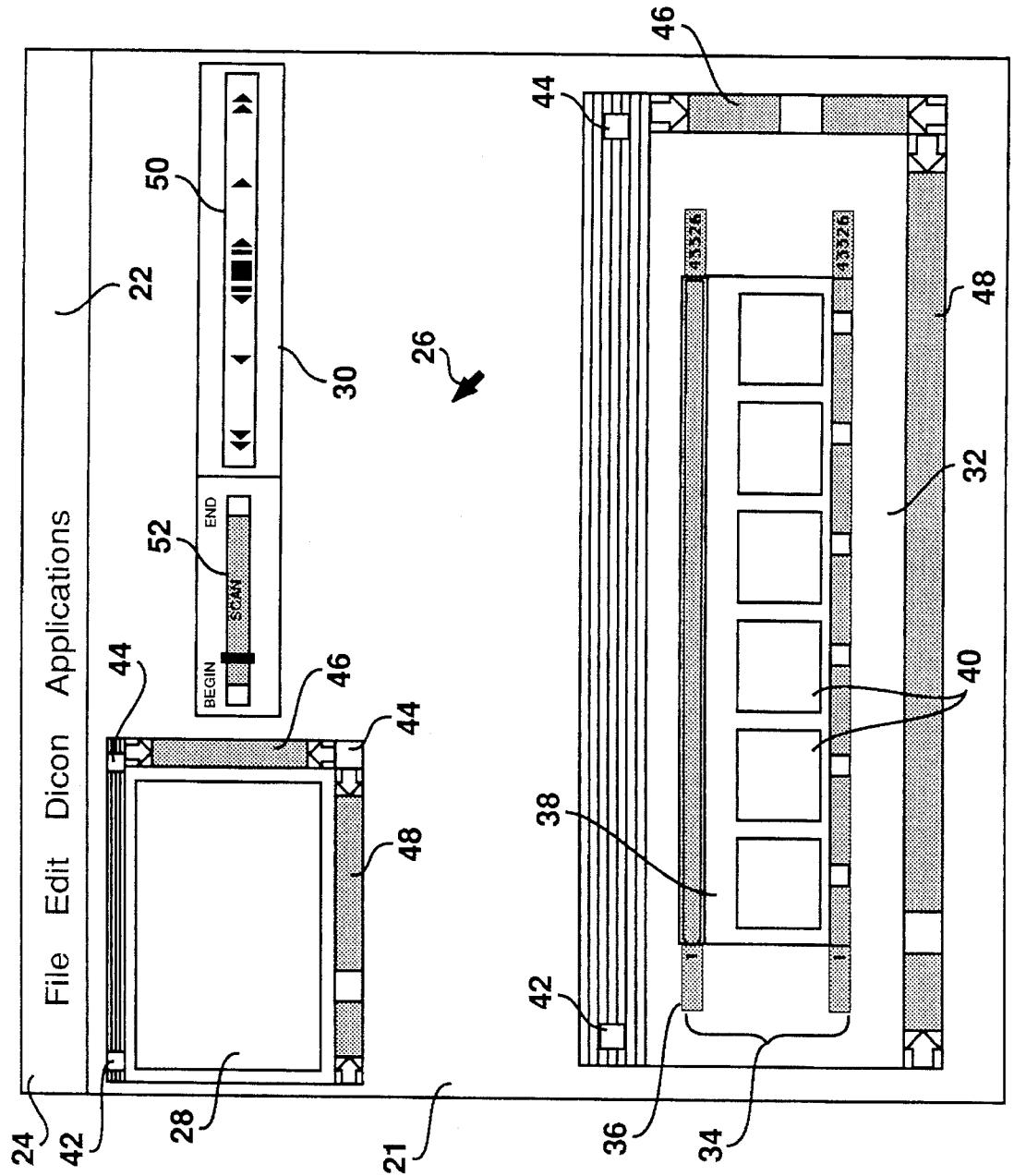
FIG. 2 is a representation of a video window, a control window, and a video log window as each might appear on the display of the video viewing/organizing system of FIG. 1.

With reference now to FIGS. 2 through 8, the basic operation of the system of the present invention will be illustrated. As shown in FIG. 2, upon initialization of the computer system 14 and the computer's system software, the user is presented with a number of operating windows displayed within a main screen 21 of the display device 20 and under the direction of application software operating in accordance with the present invention. The main screen 21 includes images of a menu bar 22 for displaying a number of menu headers, such as the file menu 24, which can be pulled down using the cursor 26 in combination with the control device 18 to list a series of commands which can be selected to perform various operations relating to the menu header, i.e., pulling down the file menu from header 24 would reveal a list of selectable commands for performing file operations like new, open and close (which, for instance, can be used in place of close boxes, as described below, to close a window).

Figure 3:
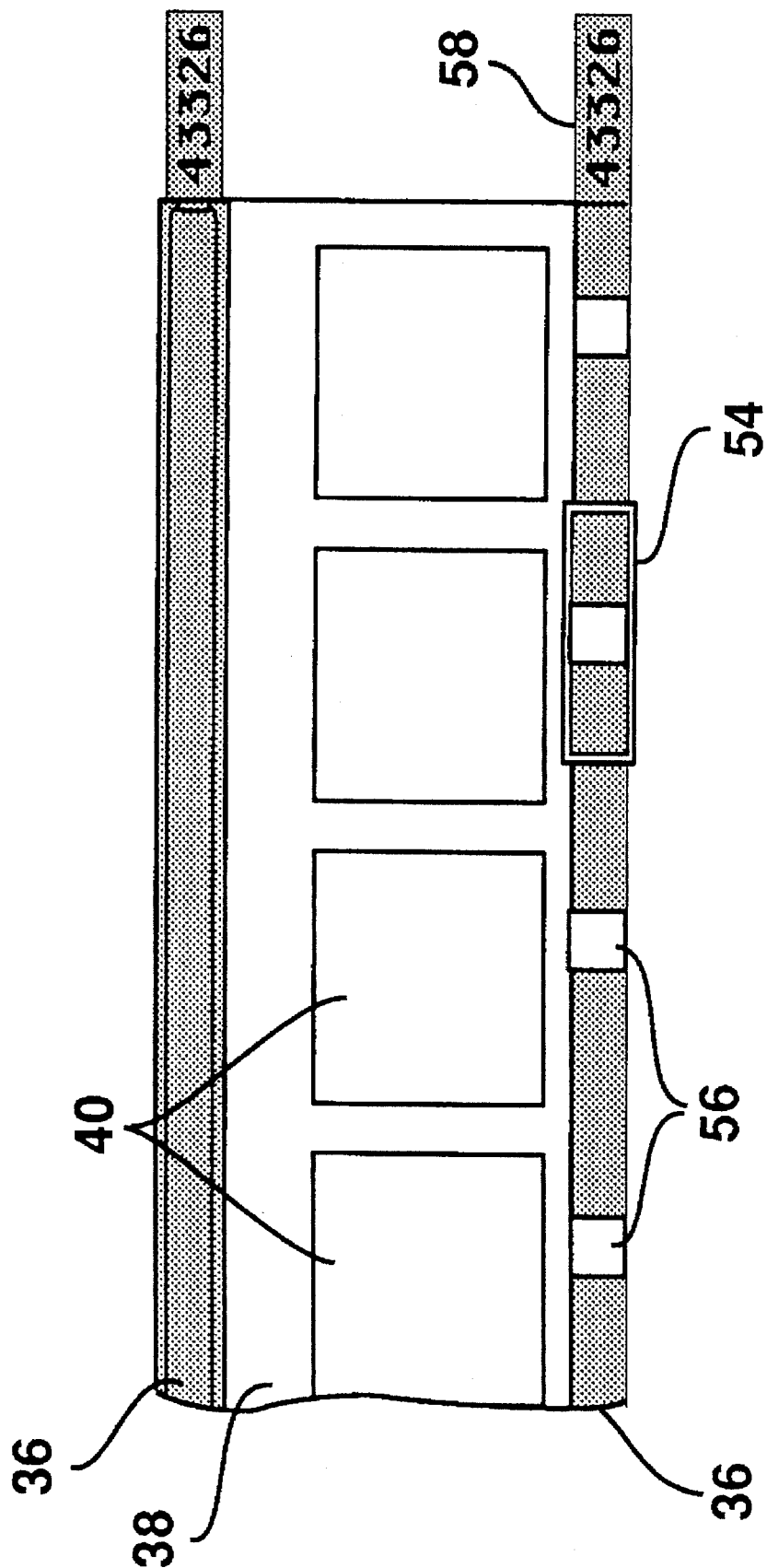
FIG. 3 is a partially-broken representation of a video log row illustrating magnifiers, key frames, and key frame markers.

The operating windows of main screen 21 include a video window 28 for viewing the contents of the video information, a control window 30 for controlling the viewing direction and velocity of the video information displayed in the video window 28, and a video log window 32 for displaying a video log 34 of the video information. The video log 34 is a hierarchically-organized overview of the contents of the database, and is typically comprised of at least one scan bar 36, and one or more logger rows 38 of temporally sequenced key frames 40. A partially-broken illustration of a video log row 34, showing its various parts in greater detail, is depicted in FIG. 3.

In some computer systems, such as the Macintosh® computer, the user will also be presented with certain functional icons which allow the user to conveniently perform certain tasks within the computer without having to type-in written commands. Windows of the computer can be formed in a variety of different ways (i.e., control window 30 purposely lacks many of the features illustrated in the video window 28), but each typically includes close boxes 42 for closing the window when it is through being used, size boxes 44 for changing the size of the window, vertical scroll bars 46 for scrolling the images within the window up and down, and horizontal scroll bars 48 for scrolling the images within the window sideways. The techniques for creating and modifying functional icons, menu bars, pull-down menus, and operating windows are all well known in the art and need not be described here for an enabling disclosure of the present invention See, Apple Computer, Inc., Inside Macintosh, Vols. I, II, and III, (1985), Addison-Wesley Publishing Company, Inc.

To display video information from the video source 10 in the video window 28 of the main screen 21, the user must first indicate to the computer system 14 the type of video source 10 to be utilized (i.e., VCR or laser-disc played and the name and/or location of the desired video information to be displayed (i.e., the starting frame position or the title of the section of information to be viewed). Once this task has been accomplished, the user can then control the display of the video information within the video window 28 through operation of the cursor 26 in combination with the control device 18, such as a mouse, trackball, keyboard, touch screen, or any type of X-Y axis input device, in combination with the radio buttons and control dials of the control window 30.

The control window 30 includes a control bar 50 having a number of standard playback direction/velocity indicators corresponding in position on the control bar 50 to a number of interactive radio buttons, which may be activated by the user with the control device to perform the selected operation denoted by the playback indicators. The standard playback indicators and control buttons correspond to the viewing direction and velocity operations of fast-reverse, reverse play, step.-reverse, stop, step-forward, forward play, and fast-forward. The control window also includes an interactive slider bar 52 having a bar-shaped control dial and a scan position indicator for pointing to the present position of the video information being displayed in the video window 28 in relation to the entire block of video information. The slider bar 52 is operated by selecting the scan position indicator with the cursor and dragging it horizontally with respect to the control dial, thereby rapidly changing the video information being displayed within the video window 28. The slider bar 52 can also be used to simply indicate the location of the video information being displayed in the video window 28 when playback of the video information is controlled through operation of the control bar 50 rather than the slider bar 52.

With reference now to FIG. 3, the physical embodiment of each video log row 38 typically includes a scan bar 36, a plurality of key frames 40, a magnifier 54, and key frame markers 56 corresponding to each key frame 40 of the row. Each scan bar 36 represents a selected portion of the database, which is typically represented by a numerical entry 58 on the left and right-hand sides of the scan bar denoting the starting and ending frames of the portion of information represented by the scan bar, respectively. As utilized herein, the term "Frame" is defined to mean a singularly unique portion of information from the database. While this particular term is especially appropriate for describing video frames, it is not intended to be limited to that definition alone and could be used to described any discernible portion of information from a wide range of different types of databases.

A magnifier 54 is typically used in conjunction with a scan bar 36 to select or limit the particular portion of information to be represented by the subsequent scan bar in the present row and the key flames of a subsequent logger row. In the preferred embodiment, as more clearly depicted in FIG. 5, the magnifier 54 above, or proceeding, a row 38 is utilized to select the subportion of information for the subsequent row 38 underneath the scan bar 36. Many other physical arrangements, however, could easily be imagined and are anticipated as part of the present invention, such as having the scan bar associated with a row as part of the row, having the rows as columns instead of rows, etc.

A key frame 40 is a pictorial label for a variable-length segment of information. In the present embodiment, a key frame is a single digitized frame (SDF) of video information selected from a segment of the portion of the database represented by the present scan bar 36. Hence, the portion of information represented by each logger row 38 is further divided into a number of segments, each of which are represented by a key frame 40, which are in turn, selectively sampled from each segment of information represented within that row. A key frame marker 56 is a graphical symbol associated with a key frame 40 whose position on the scan bar 36 indicates that key frame's position within that portion of the database represented by the scan bar 36. In the preferred embodiment, the key frame marker 56 is an even smaller SDF version (or proxy) of the key frame 40 with which it is associated, so that such an association is easily evidenced to a user. Other techniques for drawing such an association could also be utilized, such as providing adjustable guidelines which tie the marker 56 to the key frame 40, or outlining the key frame 40 in the same unique color or shade of gray as the marker 56.

Figure 4:
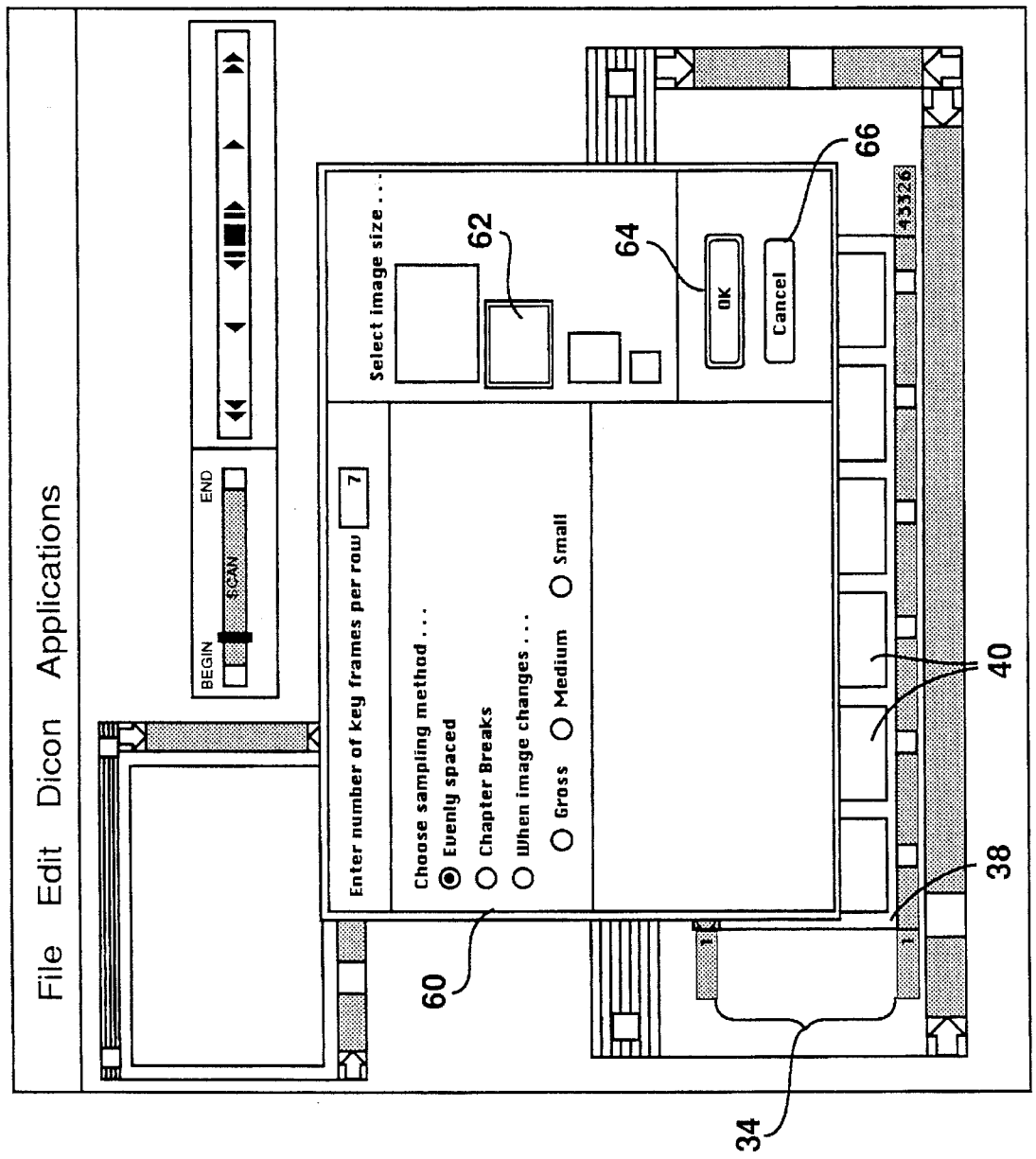
FIG. 4 is a representation of a dialog window for selecting various parameters affecting the logging process as such might appear on the display of the video system of FIG. 1.

Before viewing the video information in the video window 28, the user may set the various parameters which will affect the video logging process, as is illustrated by the dialog box 60 in FIG. 4. The dialog box 60 typically appears automatically after the user has selected the video source and the video information to be logged, or as desired by the user by selecting a particular command from a pull-down menu. Dialog box 60 allows the user to enter the number of key frames 40, which will be generated for each row of the video log 34; the method by which the video stream will be sampled to generate the key flames 40, and the size of the image to be displayed within each key frame 40. Dialog box 60 could also be configured to allow the user to select the size of a marker, whether the marker is to be a proxy or color coded, or any other video log parameter as desired. As illustrated in FIG. 4, the user has selected to sample the video information in evenly spaced segments with seven key flames 40 per row of the video log 34. The user has also selected the second largest image size, as indicated by the outlined video image 62, for the key flames 40.

The sampling method can also be selected by clicking on one of the three primary radio buttons within the sampling method portion of the dialog box 60. Although the preferred embodiment of the present invention contemplates three basic methods of generating key frames 40, i.e., evenly spaced, chapter breaks, and scene or image changes, many more such methods could be readily developed. When the evenly spaced sampling method is chosen, the distance between each key frame sample 40 of a row 38 is obtained by dividing the total number of flames of information represented by the associated scan bar 36 for that row, by the desired number of key frames 40 in that row 38. In the preferred embodiment, the first key frame sample 40 of a row 38 (on the left-hand side) is determined by taking half the calculated distance between key frame samples for that row and using that figure to find a frame of information to display within the first key frame 40. Subsequent key frame samples are offset from the previous key frame samples by the same calculated distance. For example, for a scan bar representing a portion of the database having 4900 frames, starting from frame 1 and ending at frame 4900, where there are 7 key frame samples per row, the calculated distance between key frame samples would be 4900 divided by 7, which equals 700 frames distance. The first sample would therefore be set at one=half of that distance, or selected as the 350th frame. The following samples would then be spaced a distances of 700 frames, i.e., 1050, 1750, 2450, 3150, 3850, and 4550. The largest potential distance between key frame samples is the frame number distance represented by the length of the entire scan bar 36, in which case there would only be one key frame 40 in the row 38.

If the video information to be sampled can be readily divided into identifiable chapter breaks, then the chapter breaks sampling method might be appropriate. When this sampling method is chosen, the video information is scanned until a chapter break is identified, and then a key frame 40 is generated from within the identified chapter to represent that chapter of information. If there are insufficient chapter breaks in the portion of information scanned to allow the logger row 38 to be filled with key frames 40, the evenly spaced method can be utilized to fill in the remaining key frames 40. As will be further explained below, regardless of the sampling method chosen, key frames 40, with their associated key frame markers 56, may also be arbitrarily modified by the user.

The third sampling method for generating key flames 40 involves using visual changes in the video stream to provide the information for filling in the key frames 40. If there are insufficient numbers of visual changes, either of the prior sampling methods may be utilized to fill in blank key frames 40. A user may also designate that only flames corresponding to changes of gross, medium or small significance be utilized as the key frames 40. If there were still too many visual changes per row of the video log for this technique to work, the user or the system could arbitrarily pick key frames 40 from amongst the possibilities. A natural outgrowth of this particular method for sampling the video stream is in the area of video compression techniques, where image differencing would conveniently allow for the detection of scene changes.

After setting the various video logging process parameters, the user can close the dialog box by clicking on the OK button 64. Alternatively, the user can exit the dialog box 60 before changing the parameters at any time, or without saving any changes, by simply clicking on the cancel button 66. As soon as the dialog box 60 has been closed, the system proceeds to create the video log window 32 with the first logger row 38 of the video log 34.

Figure 5:
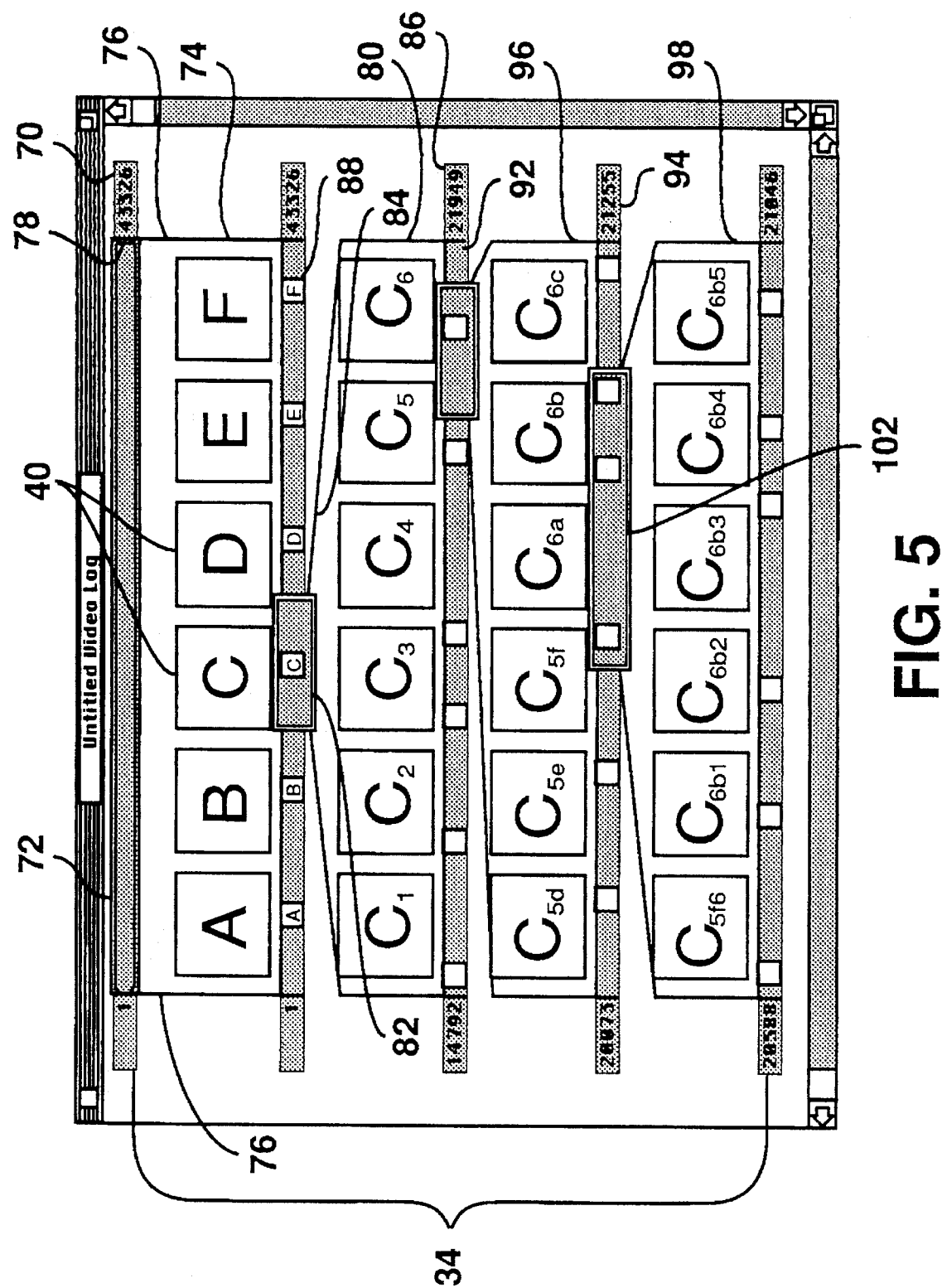
FIG. 5 is a representation of a video log window containing four rows of video log obtained by recursively magnifying one or more segments from a preceding row.

With reference now to FIG. 5, a typical video log 34 which can be created by the system of the preferred embodiment of the present invention is shown. An upper scan bar 70 sets out the portion of information which is to be used to create the video log 34, which may be the entire database or just a portion thereof. The magnifier 72 is then utilized to illustrate and determine which portion of the information made available through the representation of the scan bar 70 is to be used to create the first row 74. The guide lines 76 further illustrate what portion of the scan bar 70 is being magnified to create the first row 74. As illustrated in FIG. 5, the portion of information made available by the scan bar 70, being magnified by the magnifier 72, and being displayed in the logger row 74 includes video frames 1 through 43326, which is represented by the six key frame segments 40 (key frames A through F). When the first logger row 74 of a video log 34 is created, the magnifier 72 is set to magnify the entire portion of information represented by the scan bar 70 by default. The user may thereafter modify the amount of the information to be represented in the first row 74 by clicking on either of the magnifier handles 78 and dragging them along the X-axis, which causes the magnifier 72 to shrink or grow accordingly.

After the top row 74 has been created, the user can then proceed to generate a subrow for any one of the six key frame segments 40 of the top row by double-clicking on a key frame from one of the six key frame segments in the top row 74 or by manipulating the magnifier corresponding to the subsequent row. For example, if the user was to double-click on the key frame C, the key frame segments $C_1$ through $C_6$ of the subrow 80 would be generated and the magnifier 82 and guide lines 84 would be automatically adjusted accordingly. The user could also generate the subrow 80 by grabbing one of the handles for the magnifier 82 and adjusting it as desired. Note that the guide lines 84 and the numerical frame references 86 would always adjust to the preceding magnifier's parameters.

Any of the magnifiers may also be moved by clicking within the area of the magnifier and dragging the magnifier to the desired location. Magnifiers can also be moved by clicking on the scan bar outside of the magnifier region, thereby causing the magnifier to jump to the location of the click. Markers 88 can likewise be moved by clicking on and dragging the marker 88 to a new position on the scan bar. Although markers are not restricted to only being moved within the portion of the scan bar representing the segment of video information originally corresponding to the associated key frame, they cannot be moved past the position of any other marker 88. Hence, any one segment of information could be represented by as many markers as could possibly be moved into a position under that key frame on a particular scan bar. As a marker is moved both the SDF of the key frame and the SDF proxy of the marker are changed to correspond to the marker's new position on the scan bar and to represent the new sample of information represented by the key frame.

By moving the magnifiers of scan bars 92 and 94, additional subrows 96 and 98, respectively, could likewise be created. Since the magnifier 100 is positioned to magnify the scan bar 92 corresponding to approximately one-half of key frames $C_5$ and $C_6$, the key frames generated in row 96 would be the set $C_{5d}$ through $C_{6c}$ or some other set as appropriate. Likewise, since the magnifier 102 magnifies the scan bar 94 corresponding to a small portion of $C_{5f}$ and all of $C_{6b}$ and $C_{6c}$, the key frames generated in row 98 would be something similar to $C_{5/6}$, $C_{6a1}$, $C_{6a2}$, $C_{6b1}$, $C_{6b2}$, and $C_{6b3}$. If the user continued in this manner, a subrow would eventually be created where the key frames represented a continuous shot of the video information. Note that new key frames were generated by key frame $C_{6a}$, even though its marker was moved all of the way under key frame $C_{6b}$, because the key frames for the subsequent row are generated based on the scan bar and not the key frame segment pictorial label. Also note that guidelines are always drawn from the magnifier to the ends of the logger row being magnified so as to properly portray the magnification to the user.

The series of logger rows created in FIG. 5 can also be referred to as a path since they present a particular route through which the user has navigated the database. For example, in each of the above instances, had the user initially clicked on a key frame other than key frame C, or magnified the scan lines differently, different subrows of key frames and key frame segments would have been generated. When a video log has only one path, that path is the video log itself, but where there are many different paths, the video log is comprised of all of those paths. To facilitate the use of the video log, the user should be able to save a video log, or a path, or even a key frame, and store that information in memory for use at a different time. If so desired, a user could store paths from one video log and paste them into a different video log at another time, thereby facilitating editing operations. A user could also annotate a video log, path or key frame and be able to recall those annotations as desired when using the video log, or attach commands to a video log, path or key frame using a scripting language.

To store a path, video log, or annotation, the user would typically pull down a file menu 24 from the menu bar 22 (as shown in FIG. 2), which has been prepared for that purpose, or perform an equivalent key command. Activation of such a command would be followed by the appearance of a dialog box which would help the user name the file and figure out where to store it. Even when a user does not store a particular path, it is preferable that the system temporarily store each path that has been created while working within a particular log. This feature allows the user to automatically recreate previously developed paths that were in place when a user visited a particular portion of a scan line whenever that exact portion of the scan line is revisited. Paths saved in this fashion may be lost, or at least harder to retrieve, when the user exits the video log.

Figure 6:
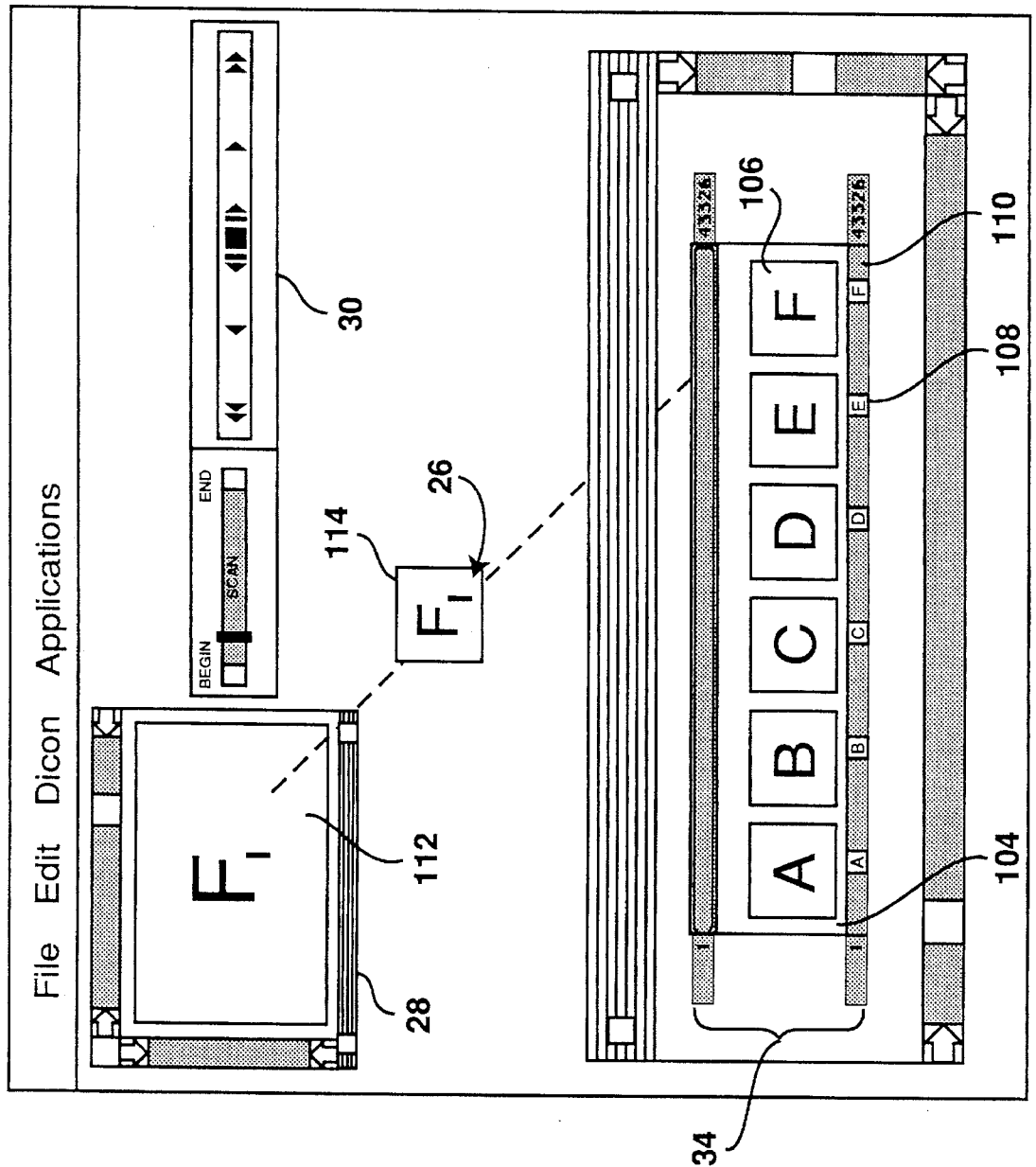
FIG. 6 is an illustration of a direct manipulation technique of the preferred embodiment of the present invention for customizing the contents of a video log row, in the video log window of FIG. 2.

With reference now to FIG. 6, once created, each key frame, logger row, or path can be readily customized by the user through simple direct manipulation techniques. For example, key frame 106 of logger row 104 can either be changed by moving the marker 108, thereby causing the key frame 106 to change accordingly, or by replacing the key frame 106 with a frame 112 chosen from the video window 28. To replace the key frame 106 with the frame 112, the user clicks on the frame 112 with the cursor 26, which causes an SDF 114, labeled "$F_1$", to be created, drags the SDF 114 into the area of the key frame 106, and releases the SDF 114 to complete the replacement. When such a substitution is made, the key frame marker 108 will be shifted to reflect the new position of the key frame 106 with respect to the scan bar 110. New key flames can also be added in this manner. If SDF 114 is dragged between two existing key frames within a logger row, the logger row will be modified accordingly to make room for the new key frame and marker. Such a modification typically involves simply expanding the length of the logger row.

Logger rows can also be modified by clicking and dragging key frames from other portions of the video log into that row, or by even pasting key frames stored in memory into that row. Video logs and paths can be modified through similar direct manipulation techniques. Video logs, paths, logger rows, and key frames can also be copied and deleted as desired through selection of command from pull down menus or through entry of a particular key commands. A number of options are available, and no particular one is preferred, when a key frame or path outside of the particular segment of information defined by a key frame or path is dragged into that area, or some other inappropriate command is performed. One approach would be to cause the transferred SDF or path to not be installed while putting up an error message requesting the user to choose a different key frame or path. A second approach would be to allow the user to make the substitution but simultaneously change the order of the key frames or paths in accordance with the user's modification. A final approach would be to simply make the substitution and let the user worry about keeping some resemblance of continuity in the video log, i.e., the user could be given the ability to turn off temporality checking if desired. Note that this feature could also be used to allow a user to set up a log which is not temporally based.

As previously stated, when a user has finished with a video log, the resulting information can be output, in whole or in part, to a digital storage medium, such as a hard drive. In addition, as described above, the user can convert the output of the computer system to a form which can be stored directly on video tape, or through operation of a second analog video source, the user can also cause select portions of the analog video information from the original video source to be recorded, in an edited sequence, onto the second analog video source. For example, a user could input all of the frames shot while producing a movie into a computer system, arrange and edit those frames as desired with the system of the present invention, and output the finished movie directly onto an analog tape. A significant benefit of the present system is that the user can arrange the frames in a wide variety of different sequences (video logs and paths) and have those different sequences replayed during the editing process in the video window 28 before ever recording the finished product to analog tape.

Figure 7:
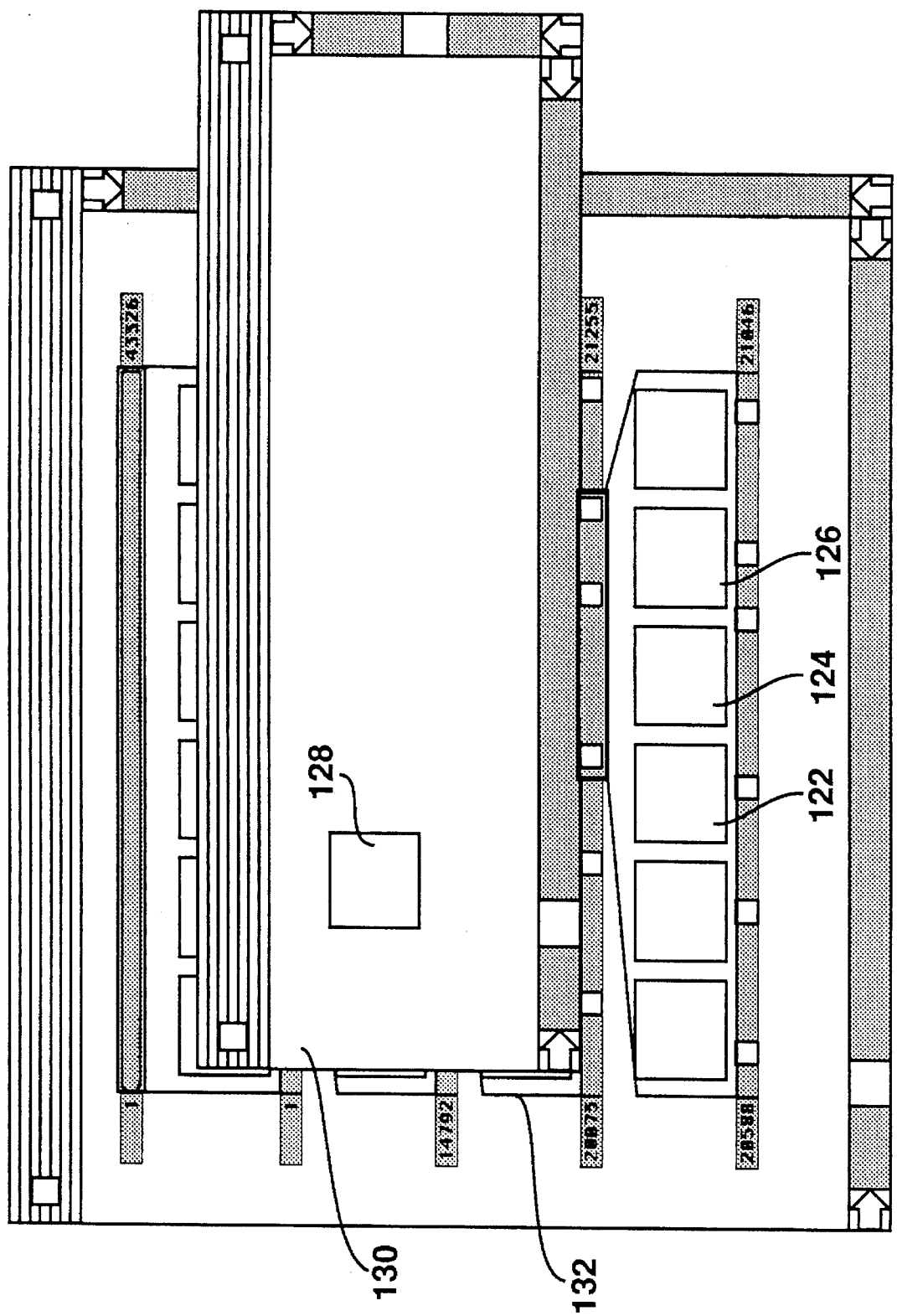
FIG. 7 is a representation of the video log window of FIG. 5 overlaid by a clip browser window for storing dicons created from combinations of key frames.

A further adjunct of the system of the present invention is that it can be used to create one or more dicons (variously described as dynamic icons, digitally animated icons, or movie icons) out of select frames of information, which can then be used in place of static key frames within a logger row, to perform space-to-time mappings of the information being viewed. As depicted in FIG. 7, dicons can be created in a number of manners. A user could select a number of key frames, such as key frames 122, 124 and 126 (although the key frames need not be adjacent), and then performs an operation command which causes the three selected key frames to be turned into a dicon 128, such as by activating a "make dicon" command from a pull down menu or a key sequence from a keyboard. The dicon 128, a looping movie entirely comprised of the digitized images of the three key frames 122, 124 and 126, would then be automatically stored at some position on the screen, such as in a clip browser 130, for later use within the video log. This dicon 128 could then be inserted back into a row 132 of the video log as, for example, a dynamic mnemonic of the video information within a particular key frame. Dicons could also be created out of the frames of information within the segment represented by a single key frame, or in other words, a key frame segment can be made into a dicon itself. With the implementation of dicons, additional control features would need to be added to the system, such as dialog boxes which allow the user to freeze the playback of the dicon, or to select the frame rate at which the frames of the dicon are displayed.

As noted above, during the process of creating a video log, one or more hierarchical representations or paths of the source information are created. Since it may be impossible to therefore view an entire video log on one screen, it may be necessary to provide some kind of overview window or scrapbook containing multiple miniaturized versions of video logs and paths, which would allow the user to view the video log and paths in an overview perspective. For example, the video log or paths could be represented in a branching tree form. Not only does this allow the user to select one or more of these miniaturized items for large-scale viewing, it also makes large-scale modifications more feasible.

With reference now to FIGS. 8 through 12, the various methods of implementing the above-described features, with regard to a preferred embodiment of the present invention, will be described. For the purpose of illustrating a simple version of the some of the major components of the preferred embodiment, certain assumptions about the user's selections are made with reference to FIGS. 8–12, such as the video source being a laser disc and the user allowing certain functions to be selected by default.

Figure 8:
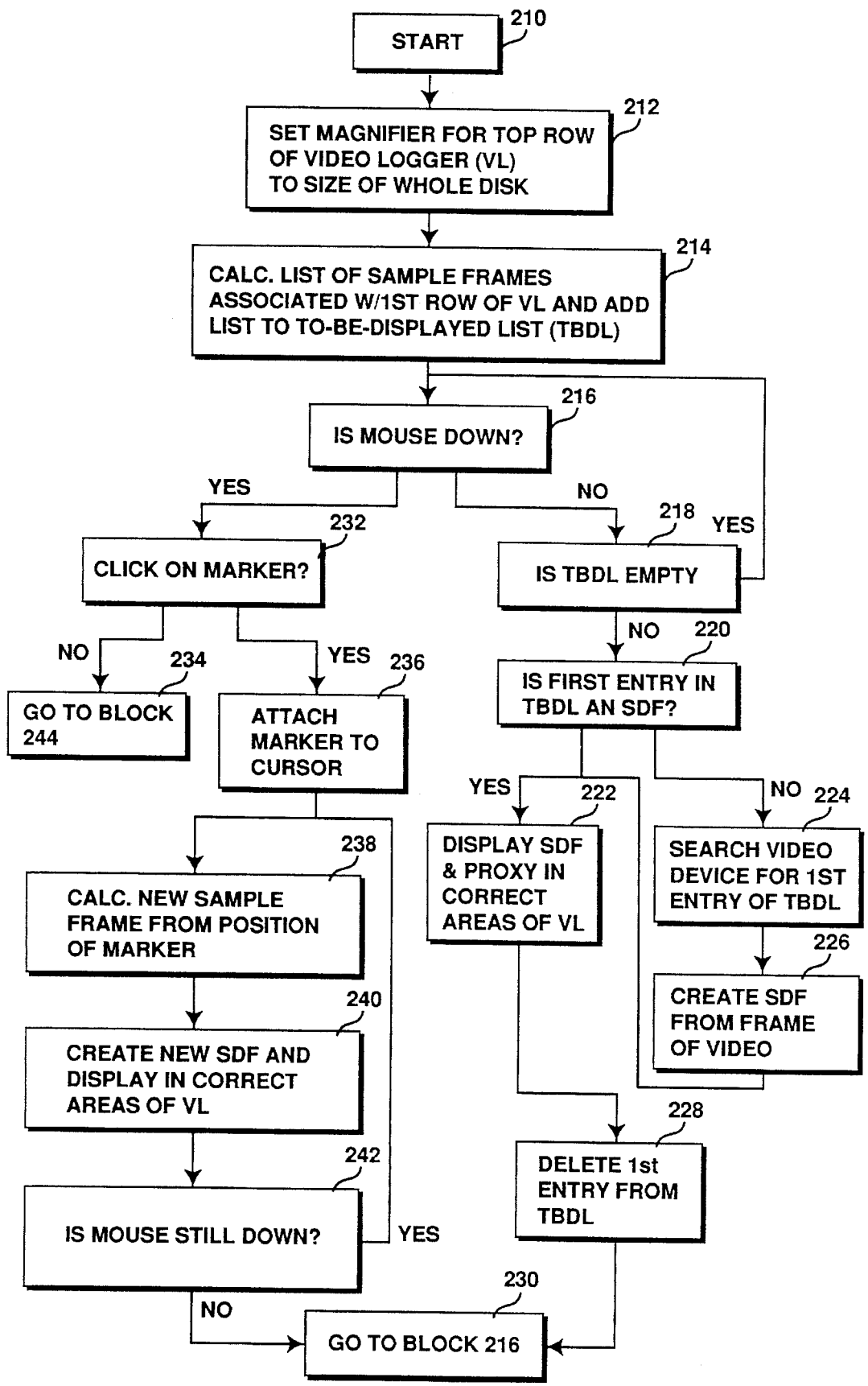
FIG. 8 is a flow chart illustrating a method for displaying SDF's and proxies and for moving key frame markers in accordance with the preferred embodiment of the present invention.

In FIG. 8, a simplified flow chart illustrating a method for displaying SDF's and proxies and for moving key frame markers is described. This flow chart is initiated, block 210, after the the user has been presented with the dialog box 60 of FIG. 3 to select the various parameters of the video log, and the video window 28, control window 30, and video log window 32 have been displayed on the screen 21 of the display. The magnifier for the top scan bar of the video log (VL) would then be set to the size of the storage capacity, or the present data storage size, of the laser disk to be sampled, block 212. As previously described, this flow chart could also be modified to allow the user to set other magnification ranges for the magnifier. The system then calculates the list of frames of information from the disc that are to be associated with the first row of the VL and adds that list to a to-be-displayed list (TBDL), block 214, which is a collection of frames that are to be made available for display as key frames within the appropriate area of a logger row.

The system then looks to see whether a mouse down signal has been entered by the user, block 216. The step of looking for a mouse down signal allows the system to fill in the key flames of the video log as appropriate, rather than cause the user to always wait until all of the key frames for a particular row had been filled in before letting the user proceed. For example, if a user knew where on the scan bar of the first logger row the next magnifier should be positioned, the user should be allowed to click on that position and create the framework for the next logger row before the key frames for the first logger row had been filled. If no mouse down signal has been entered, the system parses through the TBDL and works on creating and/or displaying SDFs as key frames of the logger row. The system calculates where to display an SDF, and its associated key frame marker proxy, based on the sampling method chosen, the size of the portion of information being scanned, the number of key frames selected for the logger row, and the corresponding SDF's position with respect to the information being represented by the scan bar.

If there are no frame samples within the TBDL, block 218, the system cycles back and waits for a mouse down signal to occur. Otherwise, the system looks at the first frame sample entry in the TBDL to see whether it needs to be digitized (meaning it is not already an SDF). If the system determines that the entry is an SDF, block 220, it then displays the SDF corresponding to that key frame, and the associated proxy, in the proper areas of the VL, block 222. If the frame sample is not an SDF, the system searches for that frame in the video device, block 224, and digitizes it to create an SDF, block 226, for display in the logger row, block 222. Once an SDF has been placed in the logger row, the first entry in the TBDL, which corresponds to the just placed SDF, is deleted from the TBDL, block 228, so that the next entry in the TBDL will be the first entry in the TBDL the next time around. Each time after the TBDL is updated, the system cycles back to look for another mouse down signal, block 230, before again looking for the first sample in the TBDL.

If the click associated with the mouse down signal occurred on one of the markers, block 232, tile marker is attached to the cursor, block 236, so that the marker can be moved with the cursor along the scan bar. A new sample frame for the key frame is then calculated based on the new position of the marker on the scan bar, block 238, and a new SDF and associated proxy are created and displayed in the correct areas of the logger row of the video log, block 240. If the mouse is still down, block 242, the system continues to look for changes in the position of the marker and continues to create new SDFs and proxies. If the mouse is no longer down, the system cycles back to block 216 to await a new mouse down signal, block 230. If and when a mouse up occurs, the last SDF and proxy created, will be the ones displayed in the logger.

Figure 9:
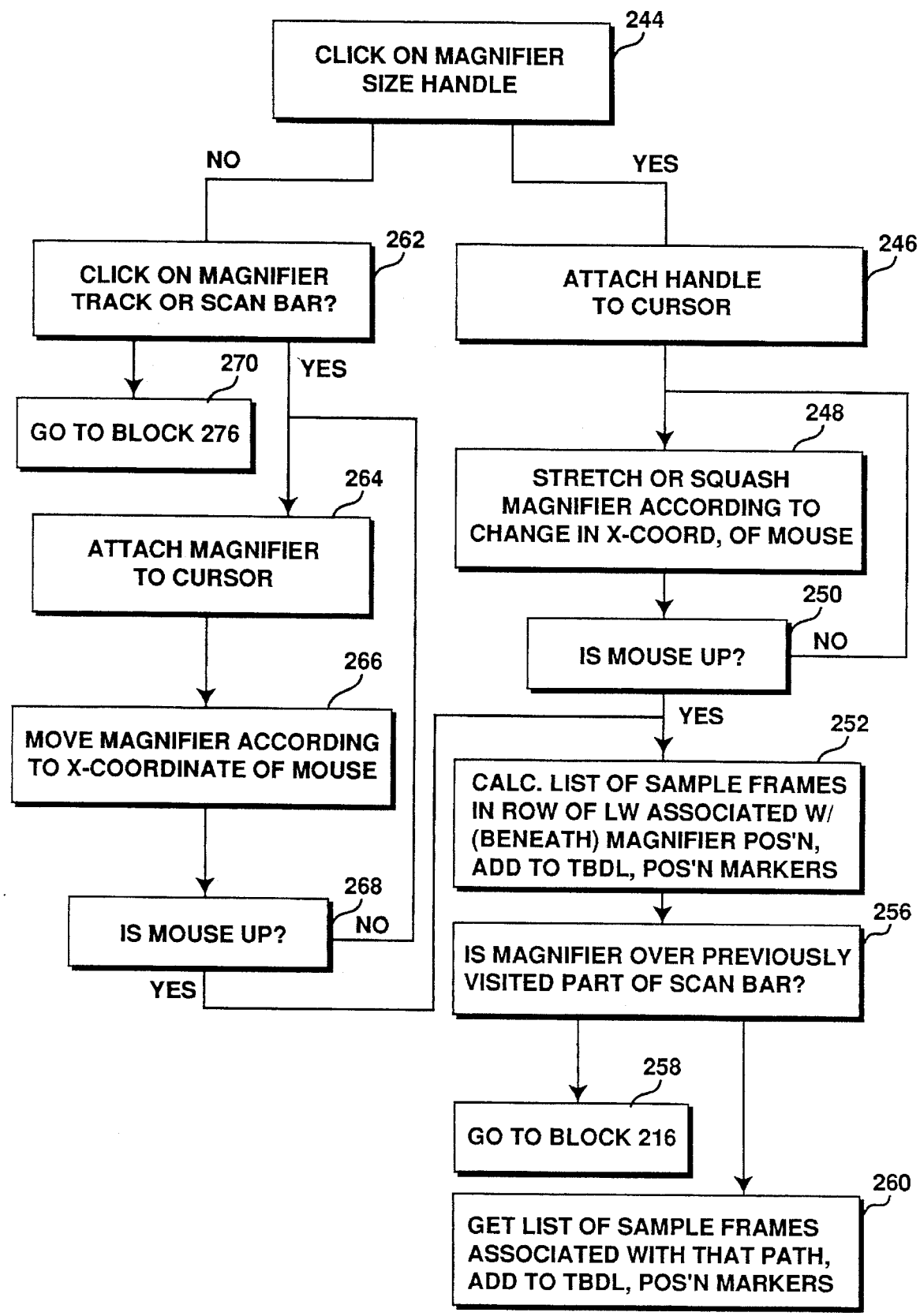
FIG. 9 is a flow chart illustrating two methods for for moving a magnifier in accordance with the preferred embodiment of the present invention.

If the click associated with the mouse down signal did not occur on one of the markers, block 234, the system looks to see whether the click occurred on one of the magnifier size handles, block 244 of FIG. 9, which is a flow chart illustrating two methods for moving a magnifier. A magnifier size handle is either one of the two sides of a magnifier which can be used to stretch or shrink a magnifier through use of the control device (the mouse). If the click was on one of the magnifier handles, the handle upon which the user clicked is the attached to the cursor, block 246. The magnifier is then either stretched or squashed according to changes in the X-coordinate position of the cursor created by changes in the position of the mouse, block 248. This continues until the system detects a mouse up command (the user releases the selection button of the mouse), block 250, at which point the system calculates the list of sample frames associated with the subsequent logger row (the logger row beneath the magnifier in question), adds that list to the TBDL, and determines the position of the markers with respect to the scan bar in the subsequent logger row, block 252.

If the subsequent magnifier is set to magnify a portion of the subsequent scan bar for which key frames and proxies have previously been calculated, a previously created path, block 256, there will be no need to recalculate the SDFs for the key flames of the subsequent row, block 258. If these SDFs and proxies have not been previously calculated, the system must once again calculate the list of sample frames that will be associated with the logger row presently being magnified, add those flames to the TBDL, and set the position of the markers for the next subsequent row, block 260. This process continues until the user magnifies a previously visited part of the scan bar or all of the possible flames have been added to the TBDL.

If the click was not on the magnifier's handles, the system looks to see if the click was on the magnifier track, the area between the handles of the magnifier, or elsewhere on the scan bar {but not on a marker}, block 262. If the click was on the magnifier track or elsewhere on the scan bar, the magnifier is attached to the cursor at the point of the click. If the user then proceeds to move the cursor while continuing to hold down the selection button of the mouse, that magnifier is moved accordingly, block 266, until a mouse up command is registered, block 268, at which point the next row and subsequent rows of key frames are generated, block 252.

Figure 10:
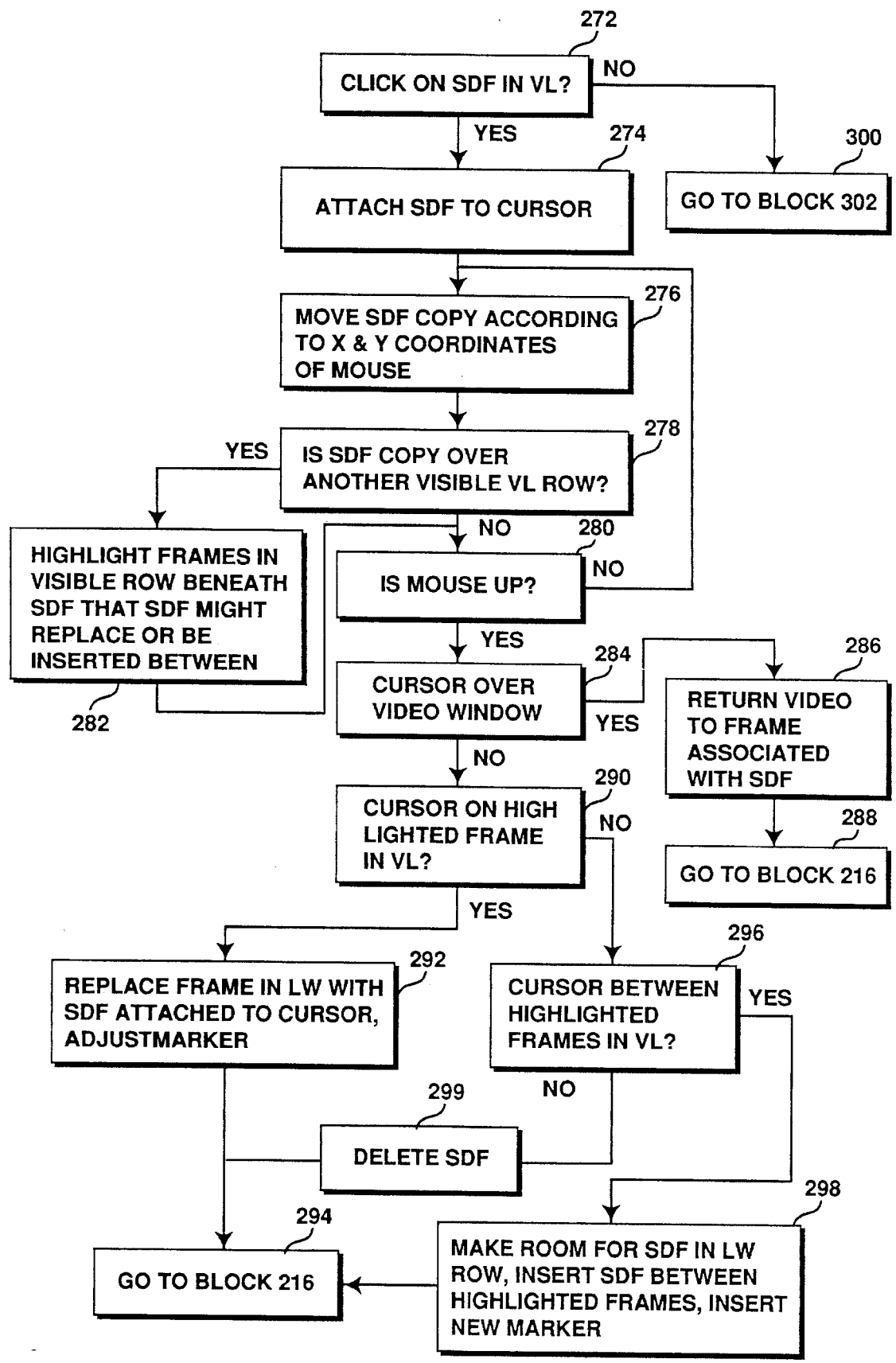
FIG. 10 is a flow chart illustrating a method for moving an SDF copy from one logger row to another logger row in accordance with a preferred embodiment of the present invention.

If the click did not occur on the magnifier track, block 270, the system looks to see if the click was on one of the key flames, or SDFs, within the video log, block 272 of FIG. 10, which is a flow chart illustrating the methods associated with moving an SDF copy from one logger row to another logger row. If the click was on an SDF, a copy of the SDF is created and attached to the cursor, block 274. The coordinate position of the SDF copy is then moved in accordance with the changes in the coordinates of the cursor under the control of the mouse, block 276, until the SDF copy is determined to be over another logger row, other than one from which it was taken, block 278, and/or a mouse up command occurs, block 280. If the SDF copy was moved over another logger row, the key frames which might be replaced by the SDF copy, as well as the key frames between which the SDF copy might be inserted, are highlighted, block 282, to inform the user of what might happen if the user was to release the SDF copy at that point.

When the mouse up command occurs and the SDF is released, the system first looks to see if the SDF copy was over the video window 28, block 284. If the SDF copy was dropped into the video window, the frame of information displayed in the video window will automatically be replaced with the flame of information associated with the SDF copy, block 286, and the system will return to looking for a new mouse down command to occur, block 288. If the SDF copy was not dropped into the video window, the system then looks to see if the user is attempting to replace a particular key flame in the new logger row, block 290. If the user is replacing a key flame, the key flame is replaced with the SDF copy attached to the cursor, the marker is adjusted accordingly, block 292, and the system goes back to waiting for a mouse down to occur, block 294. If the cursor was between highlighted key frames, rather than over a highlighted frame, block 296, room is then made within the logger row for the SDF copy and the SDF copy is inserted into the logger row between the highlighted frames, together with a new marker and proxy, block 298. If the cursor was not between key frames, it is assumed that the use has abandoned the SDF copy, whereupon the SDF copy is deleted from the screen, block 299, before the system returns to waiting for a mouse down to occur, block 294.

Figure 11:
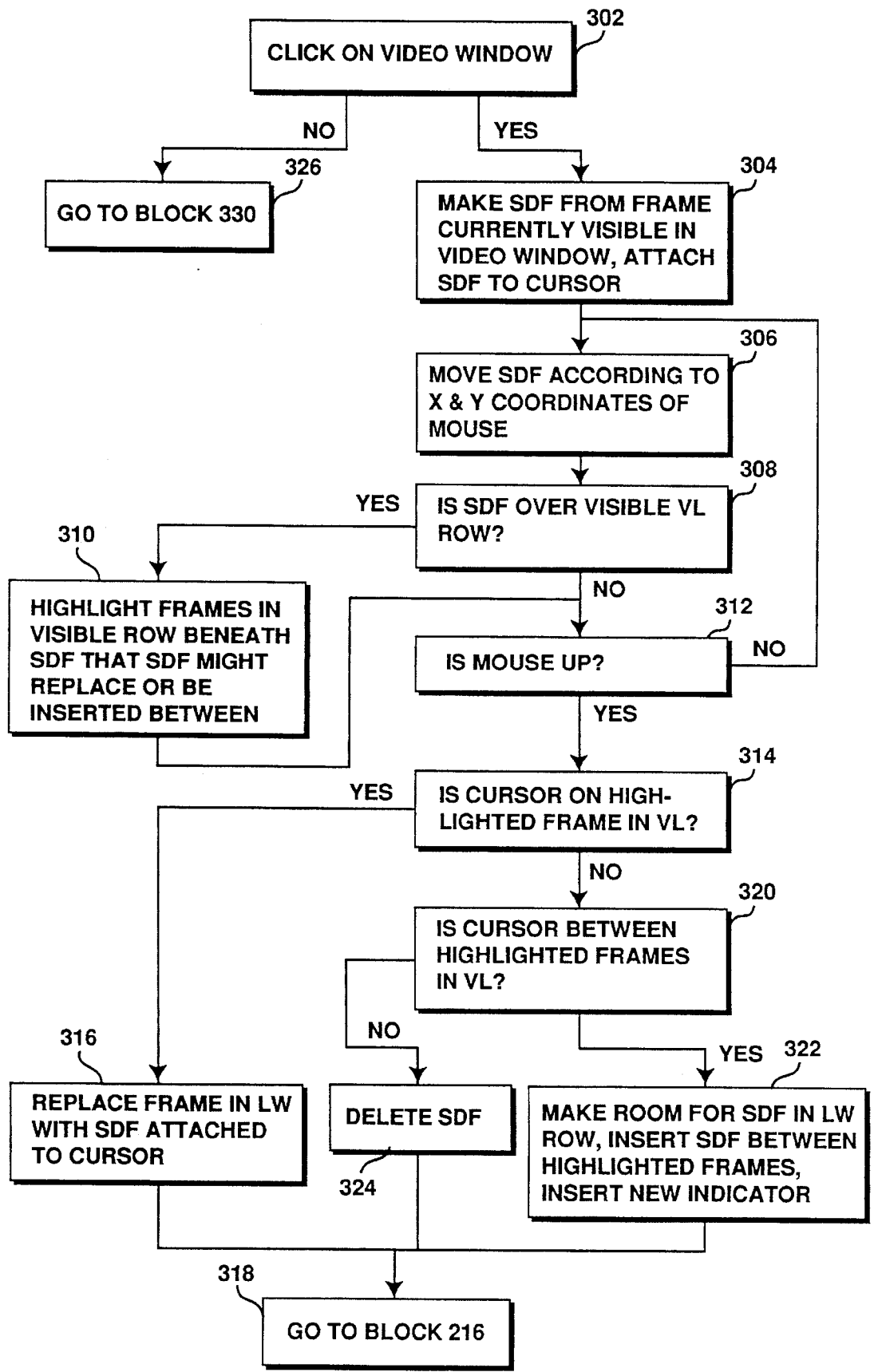
FIG. 11 is a flow chart illustrating a method for moving an SDF copy from the video window to a logger row in accordance with a preferred embodiment of the present invention.
Figure 12:
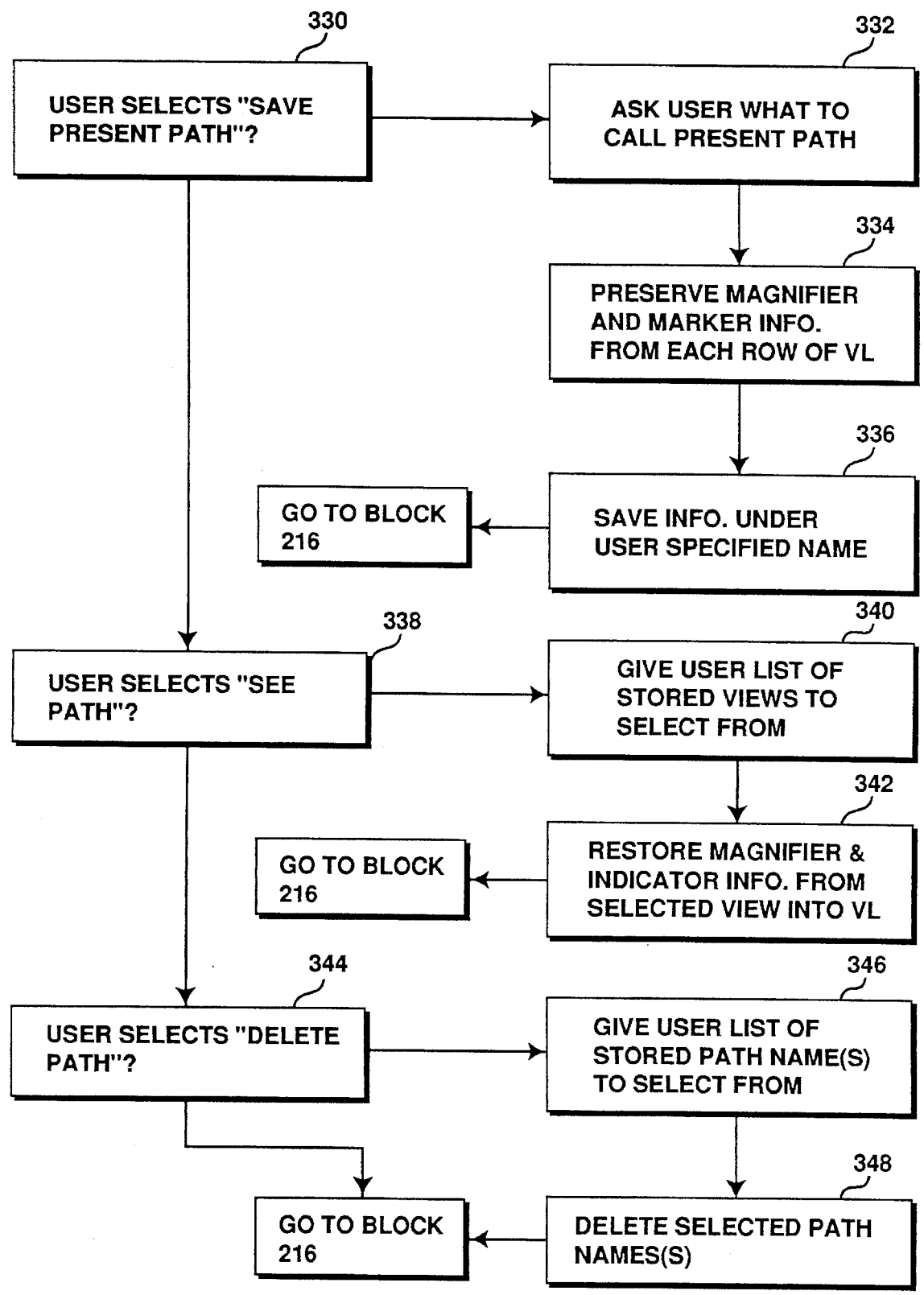
FIG. 12 is a flow chart illustrating methods for saving a path, viewing a path, and deleting a path.

If the click did not occur on an SDF in the video log, block 300, the system looks to see if the click occurred within the video window, block 302 of FIG. 11, which is a flow chart illustrating the methods associated with moving an SDF copy from the video window to a logger row. If the click did occur on the video window, the system proceeds to make an SDF from the flame of information that is currently visible in the video window. This SDF is then attached to the cursor, block 304. As the user proceeds to move the cursor by changing the X and Y-coordinates of the mouse, the SDF is moved accordingly, block 306. When the SDF has been moved over one of the logger rows visible on the display, block 308, the system proceeds to highlight the key frames over which the SDF is positioned and might replace or be placed between, block 310, if it were to be released. If a mouse up command is then detected, the system will shift from moving the SDF, block 312, to determining where to put the SDF. If the cursor was on a highlighted key flame, block 314, the SDF will be used to replace the highlighted key frame, block 316, before returning to block 216, block 318. If the cursor was between highlighted key frames, block 320, room is made for the SDF in the logger row between those key frames and the SDF and its marker proxy are inserted, block 322. Otherwise, the SDF is again considered to be abandoned by the user and is deleted, block 324, before the system returns to block 216.

If the click was not on the video window, block 326, then the system looks to see whether the user pulled down a menu to select a name to save a video log, path, or key frame. If, for example, the user pulled down and selected a menu command entitled "Save Present Path", block 330 of FIG. 12, which is a flow chart illustrating the methods associated with saving a path, viewing a path, and deleting a path, the system would proceed to ask the user to name the path, block 322. After the path had been named, the system would preserve the parameters of the magnifiers and markers from each logger row in the path of the video log, block 334, and save that information in memory under the user specified name, block 336, before returning to block 216.

If the user pulled down and selected a menu command entitled "See Path", block 338, the system would then proceed to give the user a list of stored paths from which to select, block 340. When a path had been selected, the magnifier and marker parameters from the selected path would be placed in the video log. If the user pulled down and selected a menu command entitled "Delete Path", block 344, the user would again be given a list of stored path names from which to chose, block 346, and the selected path name would be deleted, block 348.

Although the present invention has been described with reference to FIGS. 1–12 and with emphasis on a particular embodiment for carrying out the present invention, it should be understood that the figures and methods described herein are for illustration of a preferred embodiment of the present invention only and should not be taken as limitations or thought to be the only means of carrying out the present invention. For example, as previously stated, although the present invention has been described with reference to the viewing, organizing and editing of video information, the principles of the present invention are equally applicable to any form of temporally sequenced data which can be displayed in some meaningful form, or for that matter, any data which can be given sequential order by the user. In addition, although only a limited number of the methods that would be required to carry out the various aspects of the present invention have been described herein through reference to specific flow charts, it is anticipated that a person of ordinary skill in the art would be able to create such a viewing, organizing and editing system from the description provided. It is thereby contemplated that many changes and modifications may be made to the present invention without departing from the spirit and scope of the invention as disclosed above.

We claim:

1. A system for displaying a sequential stream of information, said sequential stream of information representing a plurality of frames of display data, said system comprising:

a single display displaying said display data; and a computer coupled to said display, said computer defining a first area on said display and causing the display to display a first sample of said information within said first area, said first sample representing a first segment said first segment including a plurality of frames of said display data of said information, said computer further causing the display to display a second sample of said information within said first area of said display, said second sample representing a second segment said second segment including a plurality of frames of said display data of said information, said computer further causing the display to display a third sample of said information within said first area of said display, said third sample representing a third segment of said information, and said first segment being a superset of said second segment and said third segment, said second segment being a superset of said third segment, said first sample being a first key frame, and said second sample being a second key frame, said computer further causing the display to display a plurality of samples of said information, said plurality of samples including said first sample, said second sample, and said third sample of said information, said computer causing the display to display said first sample in a first subarea with some of said plurality of displayed samples and causing the display to display said second sample and said third sample in a second subarea with some of said plurality of displayed samples, said first area including said first subarea and said second subarea, wherein said first subarea does not overlap said second subarea.

2. The system of claim 1 wherein said sequential stream of information includes video information.

3. The system of claim 1 wherein said second sample and said some of said plurality of displayed samples which are displayed in said second subarea being displayed in response to a selection of a selected sample in said first subarea, said selected sample being one of said first sample or said some of said plurality of displayed samples in said first subarea.

4. The system of claim 1 further comprising a database coupled with said computer, said database storing said information.

5. The system of claim 4 further comprising a database selector for selecting said first segment of said information from said database, and wherein said database selector is further for automatically selecting said first segment.

6. The system of claim 4 further comprising a database selector for selecting said first segment of said information from said database, and wherein said database selector includes a normal selector for manually selecting said first segment.

7. The system of claim 4 further comprising a database selector for selecting said first segment of said information from said database, and wherein said database selector includes a graphical representer for graphically representing said selector on said display.

8. The system of claim 7 wherein said graphical representer includes a scanning bar for accessing said first segment.

9. The system as recited in claim 8, wherein said selector further includes a limiter for accessing a subsegment of said first segment represented by said scanning bar.

10. The system as recited in claim 1 further including a scanning bar, said scanning bar for representing said first segment, said scanning bar further for selecting subsegments of first segment for subsequent display in a plurality of subareas.

11. The system as recited in claim 1 further comprising a sample selector, said sample selector allowing for the selection of varying numbers of samples of said information to be displayed within each of said subareas.

12. The system as recited in claim 1 further comprising a sampler for processing said information to produce said samples of said information for each of said subareas.

13. The system as recited in claim 12, wherein said sampler includes a selector for selecting a plurality of samples of said information from each segment of said information to be represented by one of said subareas, each of said plurality of samples being separated by a uniform amount of data.

14. The system as recited in claim 12, wherein said sampler includes a selector for selecting samples of said information which represent informational breaks in said sequential stream of information.

15. The system as recited in claim 12 wherein said sampler includes a selector for selecting samples of said information which represent visual changes in said sequential stream of information.

16. The system as recited in claim 1 wherein each of said subareas further includes position markers corresponding to each of said samples in said subarea for indicating the position of each of said samples with respect to the segment of information being represented within each of said subareas.

17. The system as recited in claim 16 wherein said computer includes a changer for changing one of said samples by moving the marker corresponding to said sample.

18. The system as recited in claim 16 wherein said computer causes the display to display a line extending between said first sample and a corresponding marker.

19. The system as recited in claim 16, wherein each of said markers is a copy of a sample corresponding to said marker.

20. The system as recited in claim 16, and further including a size selector for selecting the physical size of said markers.

21. The system as recited in claim 1, wherein said computer includes a mover for moving a sample from said first subarea to said second subarea.

22. The system as recited in claim 1 wherein said first sample includes a static visual image.

23. The system as recited in claim 1 wherein said first sample includes an animated visual image.

24. The system as recited in claim 23 wherein said animated visual image includes an animated loop of a stream of information corresponding to said first segment.

25. The system as recited in claim 23 wherein said animated visual image includes said first sample and said second sample.

26. The system as recited in claim 1, and further including a size selector for selecting the physical size of said samples.

27. The system as recited in claim 1, wherein system further includes an annotator for annotating said first area with additional information.

28. The system as recited in claim 1, and further comprising a selector for selectively causing the display to display said information within a second area of said display.

29. The system as recited in claim 28 wherein said information comprises a plurality of image frames, and said computer is for father selectively sequentially causing the display to display said image frames within said second area, and wherein said selector includes a controller for regulating said sequential display of frames and a rate of display of said image frames being displayed within said second area.

30. The system as recited in claim 29 further comprising a mover for moving information displayed within said second area to said first area.

31. The system as recited in claim 30, wherein said mover includes a replacer for replacing one of said samples with a new sample, said new sample corresponding to said information moved from said second area.

32. The system as recited in claim 1 wherein said first sample, said second sample, said first segment and said second segment are included in a log, said system further comprising a selector for selectively saving, restoring, and printing said log.

33. The system as recited in claim 32, further comprising a former for forming a miniaturized view of said log in a second area of said display.

34. The system as recited in claim 32, and further comprising a modifier for modifying said log by modifying said miniaturized view of said log.

35. The system as recited in claim 34, and further comprising a viewer interface for causing the display to display a log in said first area of said display by selecting a miniaturized view of said log in said second area of said display.

36. A method for viewing a sequential stream of information in a system, said sequential stream of information representing a plurality of frames of display data, said system comprising a single display coupled to a computer, said method comprising the steps of:

defining a first area on said display;

accessing a first segment of said information;

displaying a first sample of said information with some other samples of said information corresponding to said first segment in a first portion of said first area, said first sample being a first key frame;

accessing a second segment of said information wherein said first segment is a superset of said second segment;

displaying a second sample of said information with some other samples of said information corresponding to said second segment in a second portion of said first area, said second portion of said first area not overlapping said first portion of said first area, said second sample being a second key frame;

accessing a third segment of said information wherein said first segment further is a superset of said third segment;

displaying a third sample of said information with some other samples of said information corresponding to said third segment in a third portion of said first area, said third portion of said first area not overlapping said first portion of said first area.

37. The method of claim 36 wherein said second sample and said some other samples of said information corresponding to said second segment are displayed in said second portion of said first area in response to a selection of a selected sample in said first portion of said first area, said selected sample being one of said first sample or said some other samples of said information corresponding to said first segment.

38. The method of claim 36 wherein said information includes video information.

39. The method as recited in claim 36 wherein said system includes a database coupled with said computer, said database for storing said information, said method further comprising a step of selecting said first segment of said information from said database.

40. The method as recited in claim 39, wherein said step of selecting said first segment includes a step of manually selecting said first segment.

41. The method as recited in claim 39, wherein said step of selecting said first segment includes a step of automatically selecting said first segment.

42. The method as recited in claim 39, wherein said step of selecting said first segment includes a step of graphically representing said first segment on said display.

43. The method as recited in claim 36, wherein said first segment is graphically represented as a scanning bar.

44. The method of claim 43, further including the steps of:

accessing a fourth segment of said information wherein said second segment includes said fourth segment, and displaying a fourth sample in said third subarea.

45. The method of claim 44 wherein said first portion of said first area defines a first row, said second portion of said first area defines a second row, and said third portion of said first area defines a third row.

46. The method of claim 44 wherein said first segment is larger than said second segment, and wherein said second segment is larger than said fourth segment.

47. The method as recited in claim 44, wherein said step of accessing said first segment includes sampling said first segment to generate a first plurality of samples for display in said first portion of said first area and said method further includes a step of moving one of said first plurality of samples from said first portion of said first area to said second portion of said first area.

48. The method as recited in claim 36, wherein said step of accessing a first segment of said information includes a step of sampling said information to generate a plurality of samples of information for display within said first area.

49. The method as recited in claim 48, wherein said step of sampling said information includes a step of selecting a plurality of samples of said information from said first segment of said information, each of said plurality of samples representing a separate uniform subsegment of said first segment.

50. The method as recited in claim 48, wherein said step of sampling said information includes a step of selecting samples of said information which represent informational breaks in said sequential stream of information.

51. The method as recited in claim 48, wherein said step of sampling said information includes a step of selecting samples of said information which represent visual changes in said sequential stream of information.

52. The method as recited in claim 48, wherein said first area includes a plurality of position markers, wherein each of said plurality of position markers corresponds to one of said samples.

53. The method as recited in claim 52, further including a step of changing one of said plurality of samples by moving a corresponding marker.

54. The method as recited in claim 52, and further comprising the step of indicating a position of each of said samples with a displayed line extending between each of said samples and a corresponding marker.

55. The method as recited in claim 52, wherein each of said markers is a copy of a sample corresponding to said marker.

56. The method as recited in claim 52, and further comprising the step of selecting a physical size of said markers.

57. The method as recited in claim 52, and further comprising the step of uniquely encoding each of said markers to match a corresponding sample.

58. The method as recited in claim 36, wherein each of said samples corresponds to an animated segment of said information, and further comprising a step of animating said segment.

59. The method as recited in claim 36, wherein each of said samples corresponds to a segment of said information, and a said method further comprises the step of animating a loop of a series of said samples.

60. The method as recited in claim 36, further comprising the step of selecting the physical size of said samples.

61. The method as recited in claim 36, wherein said first segment, said second segment, said first sample, and said second sample are included in a log, said method further comprising a step of annotating said log with additional information and commands.

62. The method as recited in claim 36, and further comprising the step of selectively displaying said information within a second area of said display.

63. The method as recited in claim 62, wherein said information comprises a plurality of image frames and wherein said step of selectively displaying includes a step of regulating said displaying of said information, said regulating including altering a rate of change of said image frames being displayed within said second area.

64. The method as recited in claim 62, further comprising a step of moving information displayed within said second area to said first area.

65. The method as recited in claim 64, wherein said step of moving includes a step of replacing one of said samples with a new sample, said new sample corresponding to said information moved from said second area.

66. The method as recited in claim 65, further comprising a step of selecting information to be displayed within said second area by moving one of said samples from said first area to said second area.

67. The method as recited in claim 62, wherein said step of moving includes a step of adding a new sample to said first area, said new sample corresponding to said information moved from said second area.

68. The method as recited in claim 36, wherein said first segment, said second segment, said first sample, and said second sample, are included in a log, said method further comprising a step of selectively saving, restoring, and printing said log and said samples.

69. A method for displaying video information in a system, said video information representing a plurality of frames of display data, said system including a memory for storing said video information, a processor coupling with said memory for accessing said memory and displaying said video information, and a display coupling with said processor, said method comprising the steps of:

accessing a first segment of said video information;

sampling said first segment to generate a first plurality of samples including a first sample, said first sample corresponding to said first segment, said first sample being a first key frame;

dividing said video information into a plurality of subsegments, said plurality of subsegments including a subsegment M and a subsegment N, said subsegment N being a subsegment of said subsegment M;

sampling said subsegment M to generate a second plurality of samples including a sample Ms, said sample Ms corresponding to said subsegment M, said sample Ms being a second key frame;

sampling said subsegment N to generate a sample Ns, said sample Ns corresponding to said subsegment N;

defining a first area, said first area including a first subarea and a second subarea different from said first subarea;

displaying said first sample and another sample of said first plurality of samples in said first subarea; and displaying said sample Ms, another sample of said second plurality of samples and said sample Ns in said second subarea.

70. The method of claim 69 further comprising a step of resizing a display of one of said samples.

71. The method of claim 70 wherein said displaying step includes displaying Ms and said another sample of said second plurality of samples adjacent to each other.

72. The method of claim 70 wherein said samples include digitized video frames.

73. The method of claim 70 wherein each of said plurality of subsegments is approximately the same size as the other subsegments.

74. The method of claim 70 further comprising steps of:

defining a second area, and displaying video information corresponding to said one of said plurality of subsegments in said second area.

75. The method of claim 69 wherein said sample Ms and said another sample of said second plurality of samples are displayed in said second subarea in response to a selection of a selected sample in said first subarea, said selected sample being one of said first sample or said another sample of said first plurality of sample.

76. A method of displaying video information in a computer system, said video information representing a plurality of flames of display data, said method comprising the steps of:

accessing a first segment of said video information;

dividing said first segment into a first plurality of subsegments;

sampling said first plurality of subsegments to generate a first plurality of samples, each of said first plurality of samples corresponding to one of said first plurality of subsegments, said first plurality of subsegments including a subsegment M, said first plurality of samples including a sample Ms corresponding to subsegment M;

dividing M into a first plurality of subsubsegments;

sampling said first plurality of subsubsegments to generate a second plurality of samples, each of said second plurality of samples corresponding to one of said first plurality of subsubsegments, said second plurality of samples including a sample Os corresponding to a subsubsegment O;

dividing O into a first plurality of subsubsubsegments;

sampling said first plurality of subsubsubsegments to generate a third plurality of samples, each sample of said third plurality of samples corresponding to one of said first plurality of subsubsubsegments;

defining a first display area, a second display area, and a third display area, said second and third display areas not overlapping said first display area;

displaying said first plurality of samples in said first display area;

displaying said second plurality of samples in said second display area; and displaying said third plurality of samples in said third display area.

77. The method of claim 76 wherein said dividing said first segment includes:

determining a length L of said video information, and dividing said length L by a number P to generate X, where P represents the number of subsegments in said first plurality of subsegments, and where X equals a length of said video information in one subsegment of said plurality of subsegments.

78. The method of claim 76 wherein said video information includes a plurality of chapter breaks, and said dividing said first segment includes:

detecting a chapter break in said first segment, and generating M corresponding to said chapter break.

79. The method of claim 76 wherein said video information includes a visual change, and said dividing said first segment includes:

detecting a visual change in said first segment, and generating M corresponding to said visual change.

80. The method as in claim 76 wherein said second plurality of samples displayed in said second display area are displayed in response to a selection of a selected sample in said first display area, said selected sample being one of said first plurality of samples.

81. A system for displaying a sequential stream of information, said sequential stream of information representing a plurality of frames of display data, said system comprising:

a single display displaying said display data; and a computer coupled to said display, said computer defining a first area on said display, said computer causing the display to display on said display a plurality of displayed samples of said information including a first sample and a second sample, said computer causing the display to display said first sample of said information with some of said plurality of displayed samples within a first subarea of said first area, said first sample representing a first segment said first segment including a plurality of frames of said display data of said information, said computer further causing the display to display said second sample of said information with some of said plurality of displayed samples within a second subarea of said first area, said second sample representing a second segment said second segment including a plurality of frames of said display data of said information, said first segment being a superset of said second segment, said first sample being a first key frame and said second sample being a second key frame, said first area including said first subarea and said second subarea, said first subarea not overlapping said second subarea.

82. The system of claim 81 wherein said sequential stream of information includes video information.

83. The system of claim 81 further comprising:

a database coupled with said computer, said database storing said information; and a database selector for selecting said first segment of said information from said database, and wherein said database selector includes a graphical representer for graphically representing said selector on said display, said graphical representer including a scanning bar for accessing said first segment.

84. The system as recited in claim 81 further including a scanning bar, said scanning bar representing said first segment, said scanning bar for selecting subsegments of said first segment for subsequent display in a plurality of subareas.

85. The system as recited in claim 81 wherein each of said subareas further includes position markers corresponding to each of said samples in said subarea indicating the position of each of said samples with respect to the segment of information being represented within each of said subareas.

86. The system as recited in claim 85 wherein said computer includes a changer for changing one of said samples by moving the marker corresponding to said sample.

87. The system as recited in claim 85 wherein said computer displays a line extending between said first sample and a corresponding marker.

88. The system as recited in claim 81 wherein said first sample includes an animated visual image.

89. The system as recited in claim 81, and further comprising a selector for selectively causing the display to display said information within a second area of said display, wherein said information comprises a plurality of image frames, and wherein said computer further selectively sequentially causes the display to display said image frames within said second area, and wherein said selector includes a controller for regulating said sequential display of frames and a rate of display of said image frames being displayed within said second area.

90. The system as recited in claim 89 further comprising a mover for moving information displayed within said second area to said first area.

91. The system as in claim 81 wherein said second sample and said some of said plurality of displayed samples which are displayed in said second subarea being displayed in response to a selection of a selected sample in said first subarea, said selected sample being one of said first sample or said some of said plurality of displayed samples in said first subarea.

\* \* \* \* \*